US011676076B2

(12) United States Patent
Qin et al.

(10) Patent No.: US 11,676,076 B2
(45) Date of Patent: Jun. 13, 2023

(54) PREDICTION METHOD AND SYSTEM OF HIGH SLOPE DEFORMATION

(71) Applicant: China Institute of Water Resources and Hydropower Research, Beijing (CN)

(72) Inventors: Jing Qin, Beijing (CN); Tianjie Lei, Beijing (CN); Geng Sun, Beijing (CN); Lingyun Zhao, Beijing (CN); Wenlong Niu, Beijing (CN); Mingming Zhu, Beijing (CN); Yanhong Wang, Beijing (CN); Xiaomin Guo, Beijing (CN); Qian Wang, Beijing (CN); Jiabao Wang, Beijing (CN); Xiangyu Li, Beijing (CN); Yazhen Zhang, Beijing (CN); Li Zhang, Beijing (CN); Haoyu Yang, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 177 days.

(21) Appl. No.: 16/993,770

(22) Filed: Aug. 14, 2020

(65) Prior Publication Data
US 2021/0049515 A1 Feb. 18, 2021

(30) Foreign Application Priority Data

Aug. 16, 2019 (CN) .......................... 201910757451.2

(51) Int. Cl.
G06N 20/10 (2019.01)
G06N 3/006 (2023.01)
G06N 20/00 (2019.01)

(52) U.S. Cl.
CPC ............. *G06N 20/10* (2019.01); *G06N 3/006* (2013.01); *G06N 20/00* (2019.01)

(58) Field of Classification Search
CPC ........ G06N 20/00; G06N 20/10; G06N 20/20; G06N 3/00; G06N 3/004; G06N 3/006
See application file for complete search history.

(56) References Cited

PUBLICATIONS

Du et al., A New Machine-Learning Prediction Model for Slope Deformation of an Open-Pit Mine: An Evaluation of Field Data, Apr. 3, 2019, MDPI Energies, pp. 1-15. (Year: 2019).*

(Continued)

*Primary Examiner* — Shane D Woolwine
(74) *Attorney, Agent, or Firm* — EIP US LLP

(57) ABSTRACT

The present invention provides a prediction method and system of high slope deformation. First, historical deformation data of each period of each part of a high slope is obtained as sample data; the sample data is divided into training samples and test samples; then a parameter group of a Support Vector Machine (SVM) model is optimized by using the training samples and a particle Swarm Optimization (PSO) algorithm to determine an optimal parameter group of the SVM model, to obtain a trained SVM model; whether the trained SVM model satisfies a condition is verified by using the test samples, and when the SVM model does not satisfy the condition, an optimal parameter group of the SVM model is re-determined; and finally the deformation of each area of the high slope is predicted by using the SVM model that satisfies the condition.

6 Claims, 3 Drawing Sheets

(56) References Cited

PUBLICATIONS

Du et al., The Deformation Prediction of Mine Slope Surface using PSO-SVM model, Dec. 2013, Telkominka, vol. 11, No. 12, pp. 7182-7189. (Year: 2013).*

Chen et al., Performance evaluation of GIS-based new ensemble data mining techniques of adaptive neuro-fuzzy inference system (ANFIS) with genetic algorithm (GA), differential evolution (DE), and particle swarm optimization (PSO) for landslide spatial modelling, Jun. 1, 2017, Catena 157 2017, 310-324 (Year: 2017).*

Tang et al., Urban waterlogging susceptibility assessment based on a PSO-SVM method using a novel repeatedly random sampling idea to select negative samples, Jun. 27, 2019, Journal of Hydrology 576 (2019), 583-595. (Year: 2019).*

\* cited by examiner

PREDICTION METHOD AND SYSTEM OF HIGH SLOPE DEFORMATION

CROSS-REFERENCE TO RELATED APPLICATIONS

This application claims the benefit under 35 U.S.C. § 119(a) and 37 CFR§ 1.55 to Chinese patent application no. 201910757451.2 filed on Aug. 16, 2019 the entire content of which is incorporated herein by reference.

BACKGROUND OF THE INVENTION

The present invention relates to the high slope deformation monitoring field, and in particular, to a prediction method and system of high slope deformation.

High slope monitoring is a complex monitoring project, and it exists a lot of fuzzy, complex, uncertain and other external factors. In the process of high slope monitoring, it seriously affects the personal safety and work progress of construction personnel with the occurrence of a high slope collapse accident. Therefore, the real-time early warning and monitoring of a high slope and accurate prediction of a deformation value of the high slope are of great significance to the personal safety of construction personnel and the project progress.

At present, the commonly used high slope deformation prediction methods include statistical regression analysis, BP neural network, and so on. There are many factors that cause the collapse of high slopes, which makes the collapse of high slope random and uncertain. The real-time prediction and accuracy of the accidents are not high if the high slope is determined only by human experience. Among them, a statistical regression model is the most widely studied and applied model in safety monitoring. However, the statistical regression model also has its shortcomings and deficiencies, which are as follows: (1) There are many factors that affect the deformation and seepage of a high slope. In order to ensure the accuracy of the regression model, the mathematical model must be optimized according to its inherent characteristics and the physical causes of monitoring data. (2) The statistical regression model is only a speculation, which affects the diversity of factors and the unpredictability of some factors, restricting the regression analysis in some cases. The BP neural network model requires a large number of training samples, and the training speed is excessively low, so the phenomenon of slow fitting and convergence easily appear. It can be seen that the statistical regression analysis algorithm and BP neural network algorithm cannot effectively predict the high slope deformation in real time.

SUMMARY

A purpose of the present invention is to provide a prediction method and system of high slope deformation, so as to effectively carry out real time prediction of high slope deformation.

To achieve the above purpose, the present invention provides the following schemes:

A prediction method of high slope deformation includes the following steps:
  obtaining historical deformation data of each period and part of a high slope as sample data;
  dividing the sample data into training samples and test samples;
  establishing a Support Vector Machine (SVM) model by using a radial basis function as a kernel function;
  optimizing a parameter group of the SVM model by using the training samples and a Particle Swarm Optimization (PSO) algorithm determining an optimal parameter group of the SVM model, obtaining a trained SVM model;
  verifying whether an output error of the trained SVM model is less than a preset error threshold by using the test samples, obtaining a verification result; and
  if the verification result indicates that the output error is not less than the preset error threshold, re-determining an optimal parameter group of the SVM model by using the training samples and the PSO algorithm, updating the trained SVM model by using the re-determined optimal parameter group, and returning to the step of "verifying whether an output error of the trained SVM model is less than a preset error threshold by using the test samples, to obtain a verification result"; or
  if the verification result indicates that the output error is less than the preset error threshold, predicting the deformation of each area of the high slope in each period in the future in real time by using the trained SVM model.

Optionally, the optimizing a parameter group of the SVM model by using the training samples and a PSO algorithm to determine an optimal parameter group of the SVM model, to obtain a trained SVM model specifically includes:
  initializing a position vector and a velocity vector of each particle in a particle swarm;
  calculating a fitness value of each particle after initialization by using the training samples, and selecting a particle with a largest fitness value as an initial individual optimal value and an initial population optimal value, where the iteration number k is set to 0;
  updating the velocity vector of each particle by using a formula $V_i^{k+1}=wV_i^k+c_1r_1(p_k-x_i^k)+c_2r_2(g_k-x_i^k)$ and updating the position vector of each particle by using a formula $x_i^{k+1}=x_i^k+v_i^{k+1}$, where
  w is an inertia weight; i=1, 2, 3, ..., N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor;
  calculating a fitness value of each particle after updating by using the training samples, and selecting a particle with a largest fitness value as an updated individual optimal value;
  determining whether a fitness value of an individual optimal value of the $(k+1)^{th}$ iteration is greater than a fitness value of the population optimal value of the $k^{th}$ iteration, to obtain a first determining result;
  if the first determining result indicates that the fitness value of the individual optimal value of the $(k+1)^{th}$ iteration is greater than the fitness value of the population optimal value of the $k^{th}$ iteration, setting the individual optimal value of the $(k+1)^{th}$ iteration as a population optimal value;
  determining whether the iteration number is less than a preset iteration number threshold, to obtain a second determining result; and
  if the second determining result indicates that the iteration number is less than the preset iteration number threshold, increasing the iteration number by 1, and returning to the step of "updating the velocity vector of each particle by using a formula $V_i^{k+1}=wV_i^k+c_1r_1(p_k-x_i^k)+c_2r_2(g_k-x_i^k)$ and updating the position vector of each particle by using a formula $x_i^{k+1}=x_i^k+v_i^{k+1}$"; or if the second determining result indicates that the iteration number is not less than the preset iteration number threshold, setting a position vector of the population optimal value as the optimal parameter group of the SVM model.

Optionally, the calculating a fitness value of each particle after initialization by using the training samples specifically includes:

setting an element of a position vector of an $i^{th}$ initialized particle as a parameter of the SVM model, to obtain an SVM model of an $i^{th}$ particle parameter; and inputting the training samples to the SVM model of the $i^{th}$ particle parameter, and calculating a correct rate $\beta_i$ of a prediction result of the SVM model of the $i^{th}$ particle parameter by using a formula $$F_i = \beta_i = \frac{n_{iP}}{N}$$

as a fitness value $F_i$ of the $i^{th}$ initialized particle, where $n_{iP}$ is the number of samples corresponding to correct prediction results of the SVM model of the $i^{th}$ particle parameter, and N is the total number of input prediction samples.

Optionally, the obtaining historical deformation data of each period of each part of a high slope as sample data specifically includes:

obtaining the historical deformation data of each period of each part of the high slope;

conducting normalization processing on the deformation data to obtain normalized deformation data;

transforming a data format of the normalized deformation data into a data format required by a libsvm toolbox of MATLAB® (Matrix Laboratory®) software, to obtain deformation data after format transformation; and importing the deformation data after format transformation into a database of the MATLAB® software, and processing the deformation data by using a mapmainmax function in MATLAB®, to obtain processed deformation data as the sample data.

A prediction system of high slope deformation includes:

a sample data obtaining module, configured to obtain historical deformation data of each period of each part of a high slope as sample data;

a sample division module, configured to divide the sample data into training samples and test samples;

a Support Vector Machine (SVM) model establishment module, configured to establish an SVM model by using a radial basis function as a kernel function;

an optimal parameter group determining module, configured to optimize a parameter group of the SVM model by using the training samples and a Particle Swarm Optimization (PSO) algorithm to determine an optimal parameter group of the SVM model, to obtain a trained SVM model;

an optimal parameter group verification module, configured to verify whether an output error of the trained SVM model is less than a preset error threshold by using the test samples, to obtain a verification result;

a first verification result processing module, configured to re-determine an optimal parameter group of the SVM model by using the training samples and the PSO algorithm if the verification result indicates that the output error is not less than the preset error threshold, call the optimal parameter group verification module by updating the trained SVM model with the re-determined optimal parameter group, and execute the step of "verifying whether an output error of the trained SVM model is less than a preset error threshold by using the test samples, to obtain a verification result"; and a second verification result processing module, configured to predict the deformation of each area of the high slope in each period in the future by using the trained SVM model if the verification result indicates that the output error is less than the preset error threshold.

Optionally, the optimal parameter group determining module specifically includes:

a first initialization submodule, configured to initialize a position vector and a velocity vector of each particle in a particle swarm;

a second initialization submodule, configured to calculate a fitness value of each particle after initialization by using the training samples, and select a particle with a largest fitness value as an initial individual optimal value and an initial population optimal value, where the iteration number k is set to 0;

a particle update submodule, configured to update the velocity vector of each particle by using a formula $V_i^{k+1}=wV_i^k+c_1r_1(p_k-x_i^k)+c_2r_2(g_k-x_i^k)$ and update the position vector of each particle by using a formula $x_i^{k+1}=x_i^k+v_i^{k+1}$, where w is an inertia weight; i=1, 2, 3, . . . , N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor;

an individual optimal value determining submodule, configured to calculate a fitness value of each particle after updating by using the training samples, and select a particle with a largest fitness value as an updated individual optimal value;

a first determining submodule, configured to determine whether a fitness value of an individual optimal value of the $(k+1)^{th}$ iteration is greater than a fitness value of the population optimal value of the $k^{th}$ iteration, to obtain a first determining result;

a first determining result processing submodule, configured to set the individual optimal value of the $(k+1)^{th}$ iteration as a population optimal value if the first determining result indicates that the fitness value of the individual optimal value of the $(k+1)^{th}$ iteration is greater than the fitness value of the population optimal value of the $k^{th}$ iteration;

a second determining submodule, configured to determine whether the iteration number is less than a preset iteration number threshold, to obtain a second determining result;

a second determining result processing submodule, configured to: if the second determining result indicates that the iteration number is less than the preset iteration number threshold, increase the iteration number by 1, and return to the step of "updating the velocity vector of each particle by using a formula $V_i^{k+1}=wV_i^k+c_1r_1(p_k-x_i^k)+c_2r_2(g_k-x_i^k)$ and updating the position vector of each particle by using a formula $x_i^{k+1}=x_i^k+v_i^{k+1}$"; and a third determining result processing submodule, configured to set a position vector of the population optimal value as the optimal parameter group of the SVM model if the second determining result indicates that the iteration number is not less than the preset iteration number threshold.

Optionally, the second initialization submodule specifically includes:

an SVM model parameter setting unit, configured to set an element of a position vector of an $i^{th}$ initialized particle as a parameter of the SVM model, to obtain an SVM model of an $i^{th}$ particle parameter; and a fitness value calculation unit, configured to input the training samples to the SVM model of the $i^{th}$ particle parameter, and calculate a correct rate $\beta_i$ of a prediction result of the SVM model of the $i^{th}$ particle parameter by using a formula $$F_i = \beta_i = \frac{n_{iP}}{N}$$

as a fitness value $F_i$ of the $i^{th}$ initialized particle, where $n_{iP}$ is the number of samples corresponding to correct prediction results of the SVM model of the $i^{th}$ particle parameter, and N is the total number of input prediction samples.

Optionally, the sample data obtaining module specifically includes:

a deformation data obtaining submodule, configured to obtain historical deformation data of each period of each part of the high slope;

a normalization submodule, configured to conduct normalization processing on the deformation data to obtain normalized deformation data;

a format transformation submodule, configured to transform a data format of the normalized deformation data into a data format required by a libsvm toolbox of MATLAB® software, to obtain deformation data after format transformation; and a mapmainmax function processing submodule, configured to import the deformation data after format transformation into a database of the MATLAB® software, and process the deformation data by using a mapmainmax function in MATLAB®, to obtain processed deformation data as the sample data.

According to specific examples provided in the present invention, the present invention discloses the following technical effects:

The present invention provides a prediction method and system of high slope deformation. First, historical deformation data of each period of each part of a high slope is obtained as sample data; the sample data is divided into training samples and test samples; then a parameter group of a Support Vector Machine (SVM) model is optimized by using the training samples and a Particle Swarm Optimization (PSO) algorithm to determine an optimal parameter group of the Support Vector Machine model, to obtain a trained Support Vector Machine model; whether the trained Support Vector Machine model satisfies a condition is verified by using the test samples, and when the Support Vector Machine model does not satisfy the condition, an optimal parameter group of the Support Vector Machine model is re-determined; and finally the deformation of a detection point is predicted by using the Support Vector Machine model that satisfies the condition. The present invention can effectively predict deformation of the high slope in real time.

The present invention can further implement early warning of a hazard of the high slope according to the predicted deformation.

In addition, in the present invention, the PSO algorithm is used to determine the optimal parameter group of the SVM model, which can relatively quickly converge to the global optimum, and resolves a technical defect that it is not easy to select an SVM parameter. Moreover, a problem of small-sample, nonlinear, and high-dimensional pattern recognition can be better resolved by using the SVM model. The present invention can effectively predict deformation of a high slope in real time based on a PSO-SVM algorithm. This can better adapt to complex and changeable conditions of the high slope, and is of great significance to an early warning mechanism of the high slope.

BRIEF DESCRIPTION OF THE DRAWINGS

To describe the schemes in examples of the present invention or the prior art more clearly, the following briefly describes the accompanying drawings required in the examples. Apparently, the accompanying drawings in the following description show merely some examples of the present invention, and a person of ordinary skill in the art may still derive other drawings from these accompanying drawings without creative efforts.

DETAILED DESCRIPTION

An objective of the present invention is to provide a prediction method and system of high slope deformation, to effectively predict deformation of a high slope in real time.

To make the foregoing objectives, features, and advantages of the present invention clearer and more comprehensible, the present invention is further described in detail below with reference to the accompanying drawings and specific examples.

Figure 1:
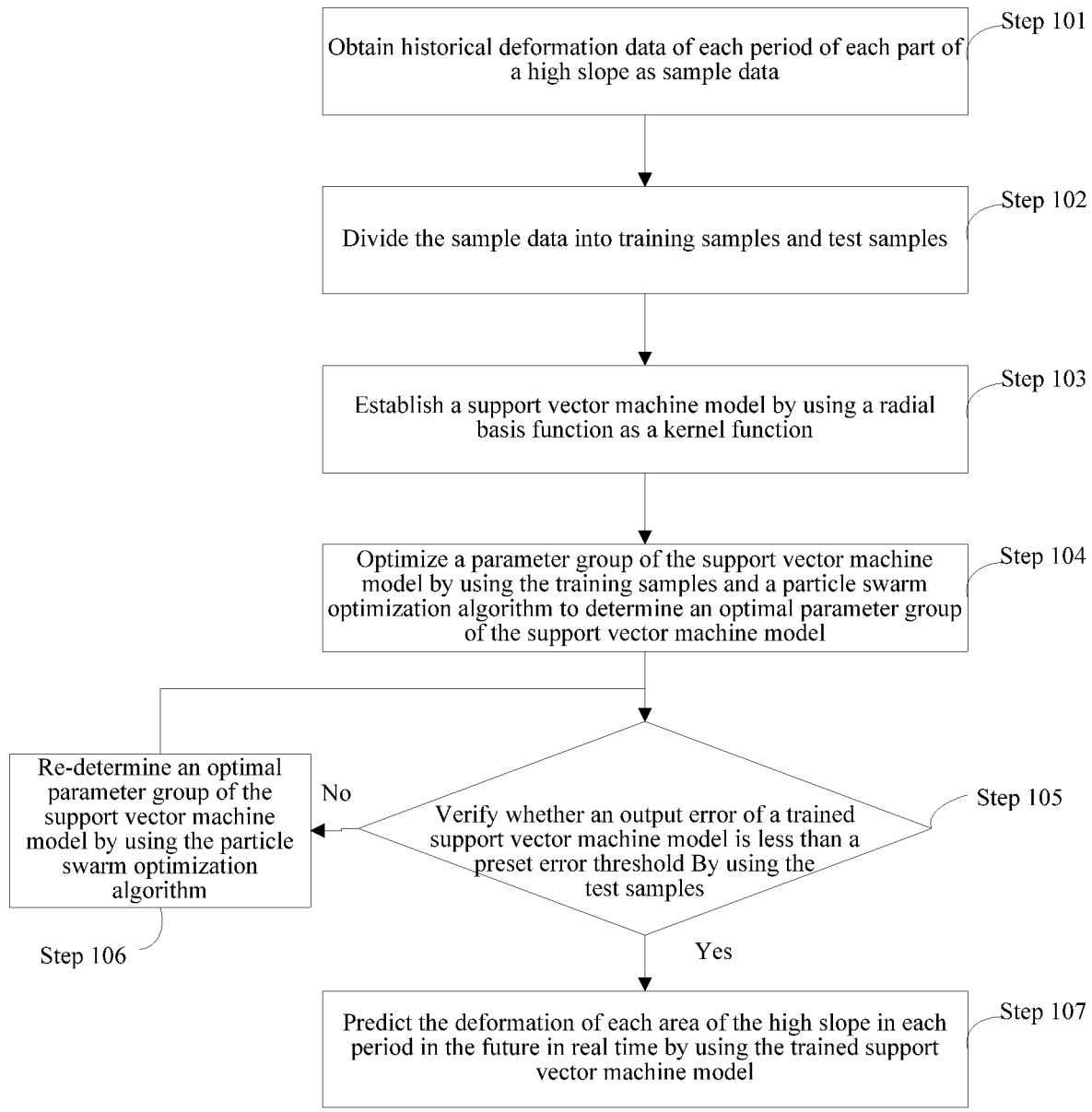
FIG. 1 is a flowchart of a prediction method of high slope deformation according to the present invention.

FIG. 1 is a flowchart of a prediction method of high slope deformation. As shown in FIG. 1, the present invention provides the prediction method of high slope deformation, where the prediction method includes the following steps:

Step 101. Obtain historical deformation data of each period of each part of a high slope as sample data.

The first, a hourly, daily, or weekly deformation of each area of the high slope is determined as a prediction object, and a prediction index (the prediction index is a relationship between the deformation and a level of a predicted hazard, and needs to be determined according to an actual situation and characteristics of the prediction object, and this is not specifically limited herein) is determined by conducting analysis according to the actual situation and the characteristics of the prediction object; and then the historical deformation data of each period of each part of the high slope is used as the sample data, a data set is prepared according to a format required by a libsvm toolbox, and the data set is imported into a database of MATLAB® software. Step 101 specifically includes: obtaining historical deformation data of each period of each part of the high slope; conducting normalization processing on the deformation data to obtain normalized deformation data; transforming a data format of the normalized deformation data into a data format required by the libsvm toolbox of the MATLAB® software, to obtain deformation data after format transformation; and importing the deformation data after format transformation into the database of the MATLAB® software, and processing the deformation data by using a mapmainmax function in MATLAB®, to obtain processed deformation data as the sample data.

Step 102. Divide the sample data into training samples and test samples.

Step 103. Establish an SVM model by using a radial basis function as a kernel function.

Step 104. Optimize a parameter group of the SVM model by using the training samples and a PSO algorithm to determine an optimal parameter group of the SVM model, to obtain a trained SVM model.

Parameters of the SVM model include a penalty parameter C and a nuclear parameter σ. The parameter group in the present invention includes the penalty parameter C and the nuclear parameter σ. An optimal penalty parameter C and an optimal nuclear parameter σ of the SVM model are obtained by using the PSO algorithm. In this case, during a $k^{th}$ iteration, a position vector of an $i^{th}$ particle in a particle swarm is $x_i^k=[x_{1i}^k, x_{2i}^k]$ where $x_{1i}^k$ corresponds to a penalty parameter C, and $x_{2i}^k$ corresponds to a nuclear parameter σ.

Figure 2:
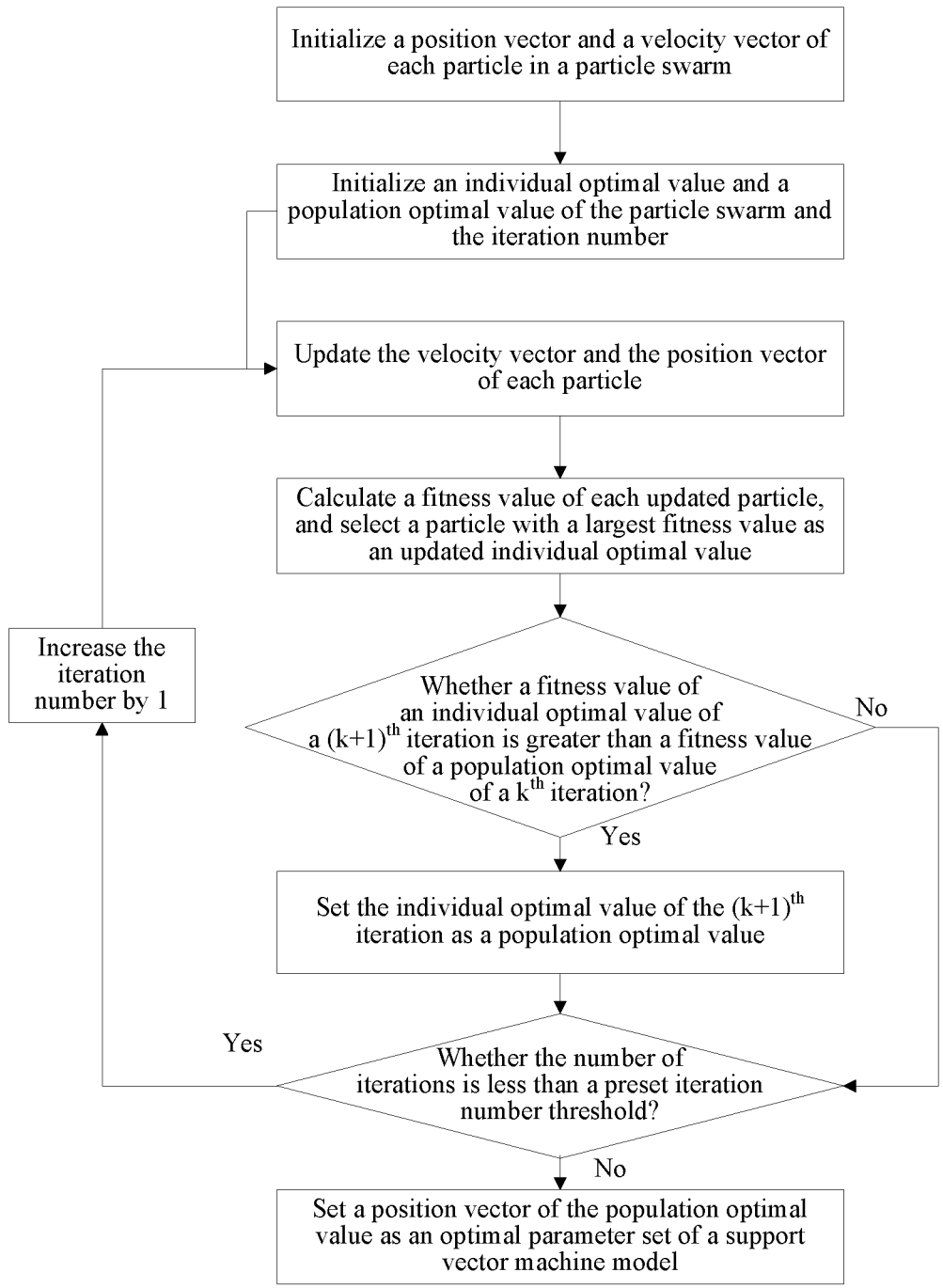
FIG. 2 is a flowchart of determining an optimal parameter group of an SVM model according to a PSO algorithm by using training samples according to the present invention.

As shown in FIG. 2, step 104 of optimizing a parameter group of the SVM model by using the training samples and a PSO algorithm to determine an optimal parameter group of the SVM model, to obtain a trained SVM model specifically includes: initializing a position vector and a velocity vector of each particle in a particle swarm; calculating a fitness value of each particle after initialization by using the training samples, and selecting a particle with a largest fitness value as an initial individual optimal value and an initial population optimal value, where the iteration number k is set to 0; updating the velocity vector of each particle by using a formula $V_i^{k+1}=wV_i^k+c_1r_1(p_k-x_i^k)+c_2r_2(g_k-x_i^k)$ and updating the position vector of each particle by using a formula $x_i^{k+1}=x_i^k+v_i^{k+1}$, where w is an inertia weight; i=1, 2, 3, ..., N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor; calculating a fitness value of each particle after updating by using the training samples, and selecting a particle with a largest fitness value as an updated individual optimal value; determining whether a fitness value of an individual optimal value of the $(k+1)^{th}$ iteration is greater than a fitness value of the population optimal value of the $k^{th}$ iteration, to obtain a first determining result; if the first determining result indicates that the fitness value of the individual optimal value of the $(k+1)^{th}$ iteration is greater than the fitness value of the population optimal value of the $k^{th}$ iteration, setting the individual optimal value of the $(k+1)^{th}$ iteration as a population optimal value; determining whether the iteration number is less than a preset iteration number threshold, to obtain a second determining result; and if the second determining result indicates that the iteration number is less than the preset iteration number threshold, increasing the iteration number by 1, and returning to the step of "updating the velocity vector of each particle by using a formula $V_i^{k+1}=wV_i^k+c_1r_1(p_k-x_i^k)+c_2r_2(g_k-x_i^k)$, and updating the position vector of each particle by using a formula $x_i^{k+1}=x_i^k+v_i^{k+1}$"; or if the second determining result indicates that the iteration number is not less than the preset iteration number threshold, setting a position vector of the population optimal value as the optimal parameter group of the SVM model.

The calculating a fitness value of each particle after initialization by using the training samples specifically includes: setting an element of a position vector of an $i^{th}$ initialized particle as a parameter of the SVM model, to obtain an SVM model of an $i^{th}$ particle parameter; and inputting the training samples to the SVM model of the $i^{th}$ particle parameter, and calculating a correct rate $\beta_i$ of a prediction result of the SVM model of the $i^{th}$ particle parameter by using a formula $$F_i = \beta_i = \frac{n_{iP}}{N}$$

as a fitness value of the $i^{th}$ initialized particle, where $n_{iP}$ is the number of samples corresponding to correct prediction results of the SVM model of the $i^{th}$ particle parameter, and N is the total number of input prediction samples.

Step 105. Verify whether an output error of the trained SVM model is less than a preset error threshold by using the test samples, to obtain a verification result.

Step 106. If the verification result indicates that the output error is not less than the preset error threshold, re-determine an optimal parameter group of the SVM model by using the training samples and the PSO algorithm, update the trained SVM model by using the re-determined optimal parameter group, and return to the step of "verifying whether an output error of the trained SVM model is less than a preset threshold by using the test samples, to obtain a verification result".

Step 107. If the verification result indicates that the output error is less than the preset error threshold, predict the deformation of each area of the high slope in each period in the future by using the trained SVM model.

The present invention can further implement early warning of a hazard of the high slope according to the predicted deformation.

Figure 3:
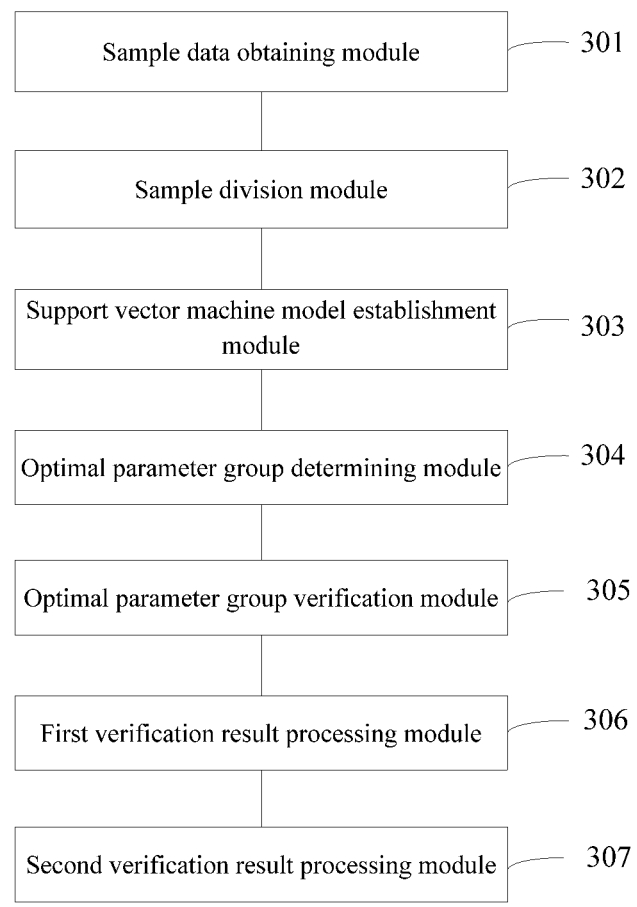
FIG. 3 is a structural diagram of a prediction system of high slope deformation.

As shown in FIG. 3, the present invention further provides a prediction system of high slope deformation, where the predicting system includes a sample data obtaining module 301, a sample division module 302, an SVM model establishment module 303, an optimal parameter group determining module 304, an optimal parameter group verification module 305, a first verification result processing module 306, and a second verification result processing module 307.

The sample data obtaining module 301 is configured to obtain historical deformation data of each period of each part of a high slope as sample data.

The sample data obtaining module 301 specifically includes: a deformation data obtaining submodule, configured to obtain historical deformation data of each period of each part of the high slope; a normalization submodule, configured to conduct normalization processing on the deformation data to obtain normalized deformation data; a format transformation submodule, configured to transform a data format of the normalized deformation data into a data format required by a libsvm toolbox of MATLAB® software, to obtain deformation data after format transformation; and a mapmainmax function processing submodule, configured to import the deformation data after format transformation into a database of the MATLAB® software, and process the deformation data by using a mapmainmax function in MATLAB®, to obtain processed deformation data as the sample data.

The sample division module 302 is configured to divide the sample data into training samples and test samples.

The SVM model establishment module 303 is configured to establish an SVM model by using a radial basis function as a kernel function.

The optimal parameter group determining module 304 is configured to optimize a parameter group of the SVM model by using the training samples and a PSO algorithm to determine an optimal parameter group of the SVM model, to obtain a trained SVM model.

The optimal parameter group determining module 304 specifically includes: a first initialization submodule, configured to initialize a position vector and a velocity vector of each particle in a particle swarm; a second initialization submodule, configured to calculate a fitness value of each particle after initialization by using the training samples, and select a particle with a largest fitness value as an initial individual optimal value and an initial population optimal value, where the iteration number k is set to 0; a particle update submodule, configured to update the velocity vector of each particle by using a formula $V_i^{k+1}=wV_i^k+c_1r_1(p_k-x_i^k)+c_2r_2(g_k-x_i^k)$, and update the position vector of each particle by using a formula $x_i^{k+1}=x_i^k+v_i^{k+1}$, where w is an inertia weight; i=1, 2, 3, ..., N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor; an individual optimal value determining submodule, configured to calculate a fitness value of each particle after updating by using the training samples, and select a particle with a largest fitness value as an updated individual optimal value; a first determining submodule, configured to determine whether a fitness value of an individual optimal value of the $(k+1)^{th}$ iteration is greater than a fitness value of the population optimal value of the $k^{th}$ iteration, to obtain a first determining result; a first determining result processing submodule, configured to set the individual optimal value of the $(k+1)^{th}$ iteration as a population optimal value if the first determining result indicates that the fitness value of the individual optimal value of the $(k+1)^{th}$ iteration is greater than the fitness value of the population optimal value of the $k^{th}$ iteration; a second determining submodule, configured to determine whether the iteration number is less than a preset iteration number threshold, to obtain a second determining result; a second determining result processing submodule, configured to: if the second determining result indicates that the iteration number is less than the preset iteration number threshold, increase the iteration number by 1, and return to the step of "updating the velocity vector of each particle by using a formula $V_i^{k+1}=wV_i^k+c_1r_1(p_k-x_i^k)+c_2r_2(g_k-x_i^k)$, and updating the position vector of each particle by using a formula $x_i^{k+1}=x_i^k+v_i^{k+1}$"; and a third determining result processing submodule, configured to set a position vector of the population optimal value as the optimal parameter group of the SVM model if the second determining result indicates that the iteration number is not less than the preset iteration number threshold.

The second initialization submodule specifically includes: an SVM model parameter setting unit, configured to set an element of a position vector of an $i^{th}$ initialized particle as a parameter of the SVM model, to obtain an SVM model of an $i^{th}$ particle parameter; and a fitness value calculation unit, configured to input the training samples to the SVM model of the $i^{th}$ particle parameter, and calculate a correct rate $\beta_i$ of a prediction result of the SVM model of the $i^{th}$ particle parameter by using a formula $$F_i = \beta_i = \frac{n_{iP}}{N}$$

as a fitness value $F_i$ of the $i^{th}$ initialized particle, where $n_{iP}$ is the number of samples corresponding to correct prediction results of the SVM model of the $i^{th}$ particle parameter, and N is the total number of input prediction samples.

The optimal parameter group verification module 305 is configured to verify, by using the test samples, whether an output error of the trained SVM model is less than a preset error threshold, to obtain a verification result.

The first verification result processing module 306 is configured to re-optimize the parameter group of the SVM model by using the training samples and the PSO algorithm if the verification result indicates that the output error is not less than the preset error threshold, to determine an optimal parameter group of the SVM model, call the optimal parameter group verification module by updating the trained SVM model with the re-determined optimal parameter group, and execute the step of "verifying whether an output error of the trained SVM model is less than a preset threshold by using the test samples, to obtain a verification result".

The second verification result processing module 307 is configured to predict the deformation of each area of the high slope in each period in the future by using the trained SVM model if the verification result indicates that the output error is less than the preset error threshold.

According to specific examples provided in the present invention, the present invention discloses the following technical effects:

The present invention provides a prediction method and system of high slope deformation. First, historical deformation data of each period of each part of a high slope is obtained as sample data; the sample data is divided into training samples and test samples; then a parameter group of an SVM model is optimized by using the training samples and a PSO algorithm to determine an optimal parameter group of the SVM model, to obtain a trained SVM model; whether the trained SVM model satisfies a condition is verified by using the test samples, and when the SVM model does not satisfy the condition, the parameter group of the SVM model is re-optimized to determine an optimal parameter group of the SVM model; and finally the deformation of a detection point is predicted by using the SVM model that satisfies the condition, to implement early warning of a hazard of the high slope. The present invention can effectively predict deformation of the high slope in real time.

The present invention can further implement early warning of a hazard of the high slope according to the predicted deformation.

In the present invention, the PSO algorithm is used to determine the optimal parameter group of the SVM model, which can relatively quickly converge to the global optimum. Moreover, a problem of small-sample, nonlinear, and high-dimensional pattern recognition can be resolved by using the SVM model. The present invention can effectively predict deformation of a high slope in real time based on a PSO-SVM algorithm. This can better adapt to complex and changeable conditions of the high slope, and is of great significance to an early warning mechanism of the high slope.

Each example of the present specification is described in a progressive manner, and each example focuses on the difference from other examples. For the same and similar parts between the examples, mutual reference may be made. For a system disclosed in the examples, since the system corresponds to the method disclosed in the examples, the description is relatively simple. For related content, reference can be made to the method description.

The principles and implementations of the present invention have been described with reference to specific examples. The description of the above examples is only for facilitating understanding of the method and the core idea of the present invention, and the described examples are only some but not all of the examples of the present invention. All other examples obtained by persons of ordinary skill in the art based on the examples of the present invention without creative efforts shall fall within the protection scope of the present invention.

What is claimed is:

1. A prediction method of high slope deformation, the predicting method comprising:
   obtaining historical deformation data of each period of each part of a high slope as sample data;
   dividing the sample data into training samples and test samples;
   establishing a Support Vector Machine (SVM) model by using a radial basis function as a kernel function;
   optimizing a parameter group of the SVM model by using the training samples and a Particle Swarm Optimization (PSO) algorithm to determine an optimal parameter group of the SVM model, to obtain a trained SVM model, comprising:
      initializing a position vector and a velocity vector of each particle in a particle swarm;
      calculating, by using the training samples, a fitness value of each particle after initialization, and selecting a particle with a largest fitness value as an initial individual optimal value and an initial population optimal value, wherein the iteration number k is set to 0;
      updating the velocity vector of each particle by using a formula $V_i^{k+1}=wV_i^k+c_1r_1(p_k-x_i^k)+c_2r_2(g_k-x_i^k)$, and updating the position vector of each particle by using a formula $x_i^{k+1}=x_i^k+v_i^{k+1}$, wherein
      w is an inertia weight; i=1, 2, 3, . . . , N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor;
      calculating, by using the training samples, a fitness value of each particle after updating, and selecting a particle with a largest fitness value as an updated individual optimal value;
      determining whether a fitness value of an individual optimal value of the $(k+1)^{th}$ iteration is greater than a fitness value of the population optimal value of the $k^{th}$ iteration, to obtain a first determining result;
      if the first determining result indicates that the fitness value of the individual optimal value of the $(k+1)^{th}$ iteration is greater than the fitness value of the population optimal value of the $k^{th}$ iteration, setting the individual optimal value of the $(k+1)^{th}$ iteration as a population optimal value;
      determining whether the iteration number is less than a preset iteration number threshold, to obtain a second determining result; and
      if the second determining result indicates that the iteration number is less than the preset iteration number threshold, increasing the iteration number by 1, and returning to the step of "updating the velocity vector of each particle by using a formula $V_i^{k+1}=wV_i^k+c_1r_1(p_k-x_i^k)+c_2r_2(g_k-x_i^k)$, and updating the position vector of each particle by using a formula $x_i^{k+1}=x_i^k+v_i^{k+1}$"; or
      if the second determining result indicates that the iteration number is not less than the preset iteration number threshold, setting a position vector of the population optimal value as the optimal parameter group of the SVM model;
   verifying whether an output error of the trained SVM model is less than a preset error threshold by using the test samples, to obtain a verification result; and
   if the verification result indicates that the output error is not less than the preset error threshold, re-determining an optimal parameter group of the SVM model by using the training samples and the PSO algorithm, updating the trained SVM model by using the re-determined optimal parameter group, and returning to the step of "verifying whether an output error of the trained SVM model is less than a preset error threshold by using the test samples, to obtain a verification result"; or
   if the verification result indicates that the output error is less than the preset error threshold, predicting the deformation of each area of the high slope in each period in the future in real time by using the trained SVM model.

2. The prediction method of high slope deformation according to claim 1, the calculating, by using the training samples, a fitness value of each particle after initialization further comprising:
   setting an element of a position vector of an $i^{th}$ initialized particle as a parameter of the SVM model, to obtain an SVM model of an $i^{th}$ particle parameter; and
   inputting the training samples to the SVM model of the $i^{th}$ particle parameter, and calculating a correct rate $\beta_i$ of a prediction result of the SVM model of the $i^{th}$ particle parameter by using a formula $$F_i = \beta_i = \frac{n_{iP}}{N}$$

as a fitness value $F_i$ of the $i^{th}$ initialized particle, wherein $n_{iP}$ is the number of samples corresponding to correct prediction results of the SVM model of the $i^{th}$ particle parameter, and N is the total number of input prediction samples.

3. The prediction method of high slope deformation according to claim 1, wherein the obtaining historical deformation data of each period of each part of a high slope as sample data specifically comprises:
obtaining the historical deformation data of each period of each part of the high slope;
conducting normalization processing on the deformation data to obtain normalized deformation data;
transforming a data format of the normalized deformation data into, to obtain deformation data after format transformation; and
performing data processing on the deformation data after format transformation to obtain the sample data.

4. A prediction system of high slope deformation, the predicting system comprising:
at least one processor; and
a memory storing instructions that, when executed by the at least one processor, cause the at least one processor to execute operations comprising:
obtaining historical deformation data of each period of each part of a high slope as sample data;
dividing the sample data into training samples and test samples;
establishing a Support Vector Machine (SVM) model by using a radial basis function as a kernel function;
optimizing a parameter group of the SVM model by using the training samples and a Particle Swarm Optimization (PSO) algorithm to determine an optimal parameter group of the SVM model, to obtain a trained SVM model, further comprising:
initializing a position vector and a velocity vector of each particle in a particle swarm;
calculating a fitness value of each particle after initialization by using the training samples, and selecting a particle with a largest fitness value as an initial individual optimal value and an initial population optimal value, wherein the iteration number k is set to 0;
updating the velocity vector of each particle by using a formula $V_i^{k+1}=wV_i^k+c_1r_1(p_k-x_i^k)+c_2r_2(g_k-x_i^k)$, and update the position vector of each particle by using a formula $x_i^{k+1}=x_i^k+v_i^{k+1}$, wherein
w is an inertia weight; i=1, 2, 3, ..., N is a particle population size; $x_i^k$ and $V_i^k$ respectively represent a position vector and a velocity vector of a $k^{th}$ iteration; $x_i^{k+1}$ and $V_i^{k+1}$ respectively represent a position vector and a velocity vector of a $(k+1)^{th}$ iteration; k is the iteration number; $p_k$ represents a position vector of an individual optimal value of the $k^{th}$ iteration; $g_k$ represents a position vector of a population optimal value of the $k^{th}$ iteration; $r_1$ and $r_2$ respectively represent a first random number and a second random number in an interval of [0,1]; and $c_1$ and $c_2$ respectively represent a first learning factor and a second learning factor;
calculating a fitness value of each particle after updating by using the training samples, and select a particle with a largest fitness value as an updated individual optimal value;
determining whether a fitness value of an individual optimal value of the $(k+1)^{th}$ iteration is greater than a fitness value of the population optimal value of the $k^{th}$ iteration, to obtain a first determining result;
setting the individual optimal value of the $(k+1)^{th}$ iteration as a population optimal value if the first determining result indicates that the fitness value of the individual optimal value of the $(k+1)^{th}$ iteration is greater than the fitness value of the population optimal value of the $k^{th}$ iteration;
determining whether the iteration number is less than a preset iteration number threshold, to obtain a second determining result;
if the second determining result indicates that the iteration number is less than the preset iteration number threshold, increasing the iteration number by 1, and returning to the step of "updating the velocity vector of each particle by using a formula $V_i^{k+1}=wV_i^k+c_1r_1(p_i-x_i^k)+c_2r_2(g_i-x_i^k)$, and updating the position vector of each particle by using a formula $x_i^{k+1}=x_i^k+v_i^{k+1}$"; and
setting a position vector of the population optimal value as the optimal parameter group of the SVM model if the second determining result indicates that the iteration number is not less than the preset iteration number threshold;
verifying, by using the test samples, whether an output error of the trained SVM model is less than a preset error threshold, to obtain a verification result;
re-determining an optimal parameter group of the SVM model by using the training samples and the PSO algorithm if the verification result indicates that the output error is not less than the preset error threshold, updating the trained SVM model with the re-determined optimal parameter group to execute the step of "verifying whether an output error of the trained SVM model is less than a preset error threshold by using the test samples, to obtain a verification result"; and
predicting the deformation of each area of the high slope in each period in the future by using the trained SVM model if the verification result indicates that the output error is less than the preset error threshold.

5. The prediction system of high slope deformation according to claim 4, the calculating a fitness value of each particle after initialization by using the training samples further comprising:
setting an element of a position vector of an $i^{th}$ initialized particle as a parameter of the SVM model, to obtain an SVM model of an $i^{th}$ particle parameter; and
inputting the training samples to the SVM model of the $i^{th}$ particle parameter, and calculating a correct rate $\beta_i$ of a prediction result of the SVM model of the $i^{th}$ particle parameter by using a formula $$F_i = \beta_i = \frac{n_{iP}}{N}$$

as a fitness value $F_i$ of the $i^{th}$ initialized particle, wherein $n_{iP}$ is the number of samples corresponding to correct prediction results of the SVM model of the $i^{th}$ particle parameter, and N is the total number of input prediction samples.

6. The prediction system of high slope deformation according to claim 4, the obtaining historical deformation data of each period of each part of a high slope as sample data further comprising:
obtaining historical deformation data of each period of each part of the high slope;
conducting normalization processing on the deformation data to obtain normalized deformation data;

transforming a data format of the normalized deformation data into deformation data after format transformation; and performing data processing on the deformation data after format transformation to obtain the sample data.

* * * * *